Feb. 7, 1950   J. C. STOKES   2,496,421
DRILL BIT
Filed May 7, 1946
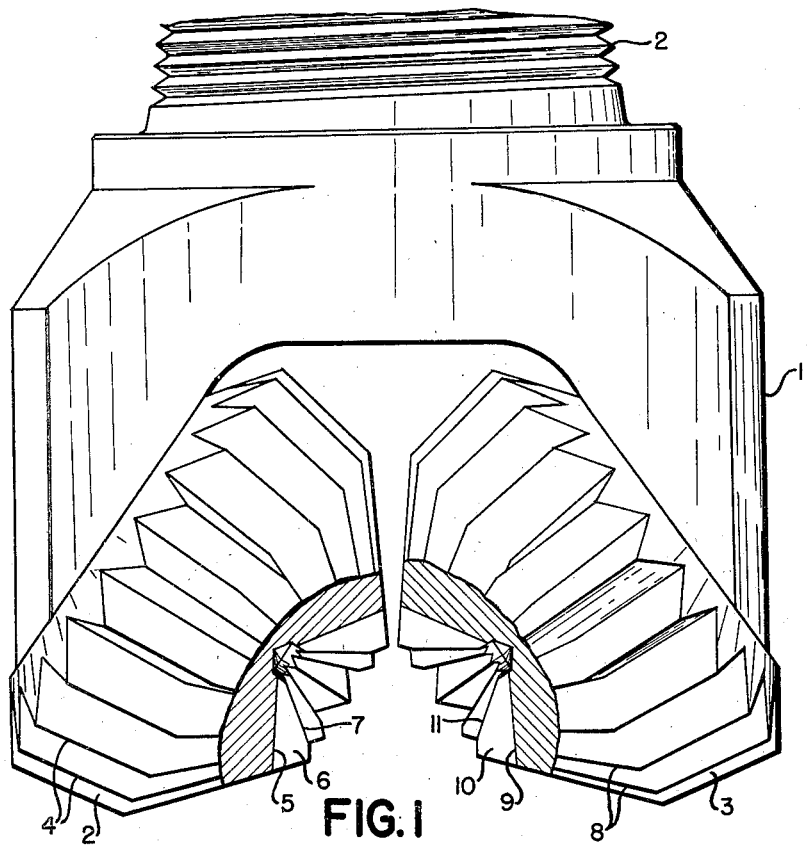
FIG. I
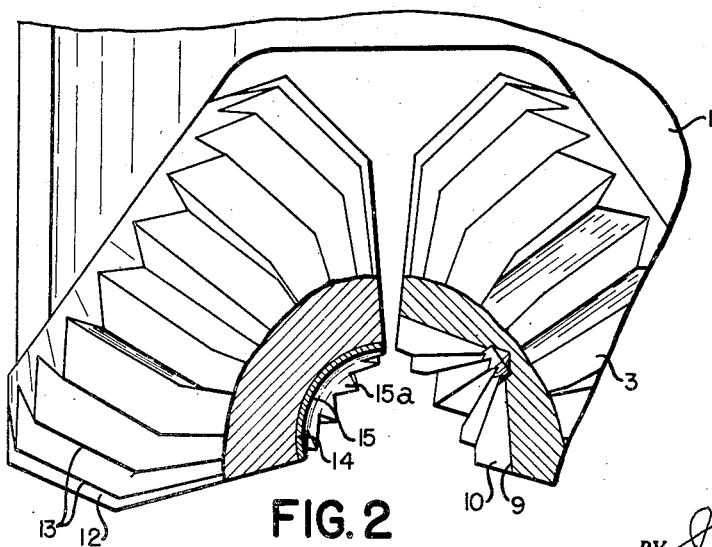
FIG. 2
JOHN C. STOKES
INVENTOR.
BY
ATTORNEYS Patented Feb. 7, 1950

2,496,421

UNITED STATES PATENT OFFICE 2,496,421

DRILL BIT

John C. Stokes, Houston, Tex., assignor to Reed Roller Bit Company, Houston, Tex., a corporation of Texas Application May 7, 1946, Serial No. 667,851

6 Claims. (Cl. 255—71)

This invention relates generally to deep well drilling apparatus and specifically to roller bits.

The conventional so-called cone bit embodies a head and substantially conical roller cutters mounted in the head to rotate on axes extending downwardly and inwardly toward the longitudinal axis of the head. These cutters traverse substantially the entire area of the bottom of the hole, the cutting teeth of each cutter extending from a point just outside the side of the head substantially to the longitudinal axis of the head. The central portion of the bottom of the hole is cut by the point portions of the cone cutters, and the teeth on the point portions are necessarily small shallow teeth which cut slower than do the larger teeth on the base portions of the cone cutters. This often results in the destruction of the teeth on the points of the cone cutters, and the formation of a core in the central portion of the bottom of the hole.

This invention has for one of its specific objects the provision of a bit having frusto-conical roller cutters with relatively large teeth on their point portions to effectively cut the central portion of the bottom of the hole.

In the preferred embodiments herein disclosed each of the cutters is provided with a recess in its point end, with relatively large cutting teeth in the recess to effectively cut the central portion of the bottom of the hole; or one of the cutters may be provided with such cutting teeth and the other with a recess to receive the central portion of the bottom of the hole, the walls of said recess being hard surfaced to reduce wear and serving to break up the core.

Various other objects and advantages will hereinafter appear.

Referring to the drawings in which the preferred embodiments are disclosed: Fig. 1 is a side elevation of a roller bit with the point portions of the frusto-conical roller cutter in section to illustrate the recesses and cutting teeth in said recesses; and Fig. 2 is a fragmentary side elevation of a roller bit with the point portions of the frusto-conical cutters broken away to illustrate one recess with cutting teeth and the other hard surfaced.

In Fig. 1 the bit head is indicated at 1. It has a threaded shank 2 for attachment to the usual drill stem. Rotatable in the head on axes that extend downwardly toward the longitudinal axis of the head are oppositely disposed frusto-conical roller cutters 2 and 3. Cutter 2 has peripheral cutting teeth 4 and in its point end a recess 5 tapering inwardly toward the axis of cutter 2. In this recess are relatively large cutting teeth 6, formed on the wall of the recess, the cutting edges 7 of which are at an angle to the axis of the cutter 2 less than the angle of the recess wall 5 to the cutter axis. Therefore the outer ends of the cutting edges 7 extend inwardly toward the center line of the bit body further than do the inner ends thereof. Only a small diameter core is left uncut at the center of the bore bottom. This is readily broken up and cut up by the outer portions of cutting edges 7 at the top of the recesses of the bits, because these outer portions are displaced from the bit axis of rotation sufficiently far that they are moving at a relatively high rate in operation. Also, the upstanding character of this core leads to the ease and rapidity with which it may be destroyed.

The cutter 3 is provided with corresponding peripheral teeth 8, recess 9 and cutting teeth 10 having cutting edges 11.

It will be obvious to those skilled in the art that when the bit 1 is rotated on its longitudinal axis by the drill stem (not shown) the cutters 2 and 3 will be moved around on the bottom of the hole; and as the cutters 2 and 3 rotate on their respective axes the bottom of the hole will be cut by the peripheral teeth 4 and 8 and by the cutting teeth 6 and 10 in the recesses 5 and 9. And the cutting teeth 6 and 10 are of such size and are so arranged that they will far more effectively cut the central portion of the bottom of the hole than will the relatively small cutting teeth on the exterior of the points of conventional cone cutters.

Referring now to Fig. 2, in this embodiment the head 1 and cutter 3 are the same as are the head 1 and cutter 3 of the embodiment of Fig. 1. In place of the cutter 2 in Fig. 1, however, this embodiment has a cutter 12 having peripheral teeth 13 and a recess 14 in its point portion. This recess 14 is a rounded recess, and the wall of this recess is hard surfaced, as indicated by the numeral 15, to resist wear. The hard surfacing material may be tungsten carbide, for example. In this embodiment, the recess 14 receives the core which will extend upwardly from the central portion of the bottom of the hole, and the concave surface 15a of the recess will break off portions of the core in the path of the cutting teeth 10 in the recess in the other cutter.

The active cutting teeth of the conventional cone cutter are the peripheral teeth below the axis of rotation of the cutter, and these teeth operate upon the bottom of the hole substantially from the center to the wall of the hole, all of said teeth moving in the same direction of rotation. In the preferred embodiments of this invention herein illustrated the active cutting teeth are the peripheral teeth below the axis of rotation of the cutter which operate upon the bottom of the hole from the central portion to the wall of the hole, and the recess cutting teeth above the axis of rotation of the cutter operate upon the central portion of the bottom of the hole. The cutting teeth in the recess of each cutter move in a direction of rotation opposite to that of the cutting teeth in the recess of the other cutter. A twisting, cutting, scraping and grinding action is thereby provided which is highly effective in drilling.

The drawings herein illustrate a bit with two cutters. It will be understood that three or more cutters may be used. The invention is not limited to the preferred embodiments herein disclosed. Various changes will occur to those skilled in the art all within the scope of the following claims.

Having described my invention, I claim:

1. A roller bit having a head, a pair of roller cutters rotatable on axes extending downwardly and inwardly substantially toward the longitudinal axis of said head, said cutters being substantially frusto-conical with their base ends adjacent the outer sides of the head, and their point ends adjacent the longitudinal axis of the head, each of said cutters having a recess in its point end tapering inwardly from the periphery thereof toward the axis of said cutter, and cutting teeth formed on the wall of said recess, the cutting edges of said teeth tapering inwardly toward the axis of said cutter at an angle to said cutter axis less than the angle of the wall of said recess to said cutter axis, and each of said cutters having peripheral teeth.

2. A roller bit having a head, a pair of roller cutters rotatable on axes extending downwardly and inwardly substantially toward the longitudinal axis of said head, said cutters being substantially frusto-conical with their base ends adjacent the outer sides of the head, and their point ends adjacent the longitudinal axis of the head, one of said cutters having a recess in its point end tapering inwardly from the periphery thereof toward the axis of said cutter, and cutting teeth formed on the wall of said recess, the cutting edges of said teeth tapering inwardly toward the axis of said cutter at an angle to said cutter axis less than the angle of the wall of said recess to said cutter axis, the other of said cutters having a rounded recess opposite the recess in said first mentioned cutter, and each of said cutters having peripheral teeth.

3. A roller bit having a head, a roller cutter rotatable on an axis extending downwardly and inwardly substantially toward the longitudinal axis of said head, said cutter being substantially frusto-conical with its base end adjacent the outer side of the head and its point end adjacent the longitudinal axis of the head, said cutter having a recess in its point end which recess tapers inwardly from the periphery to the axis of the cutter, cutting teeth formed on the wall of said recess, and peripheral cutting teeth.

4. A roller bit having a head, a pair of roller cutters rotatable on axes extending downwardly and inwardly substantially toward the longitudinal axis of said head, said cutters being substantially frusto-conical with their base ends adjacent the outer sides of the head, and their point ends adjacent the longitudinal axis of the head, each of said cutters having a recess in its point end which recess tapers inwardly from the periphery to the axis of the cutter, cutting teeth formed on the wall of said recess, and peripheral cutting teeth.

5. A roller bit having a head, a pair of roller cutters rotatable on axes extending downwardly and inwardly toward the longitudinal axis of said head, said cutters being substantially frusto-conical with their base ends adjacent the outer sides of the head, and their point ends adjacent the longitudinal axis of the head, each of said cutters having peripheral cutting teeth, one of said cutters having a recess in its point end which recess tapers inwardly from the periphery to the axis of the cutter and cutting teeth formed on the wall of said recess, and the other of said cutters having a generally concave recess in its point end.

6. A substantially frusto-conical roller cutter having peripheral cutting teeth, a tapered recess in its point end which tapers inwardly from the periphery of said cutter to the axis thereof, and cutting teeth formed on the wall of said recess.

JOHN C. STOKES.

REFERENCES CITED

The following references are of record in the file of this patent:

UNITED STATES PATENTS

| Number | Name | Date |
|---|---|---|
| 1,905,066 | Scott | Apr. 25, 1933 |
| 1,957,532 | Flynn | May 8, 1934 |